(12) United States Patent
Kull

(10) Patent No.: US 6,980,393 B2
(45) Date of Patent: Dec. 27, 2005

(54) LOW POWER SPINDLE MOTOR WITH A FLUID DYNAMIC THRUST BEARING HAVING A REDUCED OUTER DIAMETER

(75) Inventor: Andreas Kull, Hufingen (DE)

(73) Assignee: Minebea Co., Ltd. (JP)

( * ) Notice: Subject to any disclaimer, the term of this patent is extended or adjusted under 35 U.S.C. 154(b) by 179 days.

(21) Appl. No.: 10/385,912

(22) Filed: Mar. 11, 2003

(65) Prior Publication Data

US 2003/0197975 A1 Oct. 23, 2003

Related U.S. Application Data

(60) Provisional application No. 60/363,818, filed on Mar. 12, 2002.

(51) Int. Cl.[7] .............................................. G11B 17/02
(52) U.S. Cl. ........................ 360/99.08; 360/90; 384/112
(58) Field of Search ........................... 360/99.08, 98.07, 360/99.04; 310/90, 67 R; 384/112–115, 107

(56) References Cited

U.S. PATENT DOCUMENTS

| | | |
|---|---|---|
| 5,427,456 A | 6/1995 | Hensel |
| 5,433,529 A | 7/1995 | Hensel |
| 5,536,088 A | 7/1996 | Cheever et al. |
| 5,658,080 A | 8/1997 | Ichiyama |
| 5,810,480 A | 9/1998 | Asada et al. |
| 5,847,479 A | 12/1998 | Wang et al. |
| 6,023,114 A * | 2/2000 | Mori et al. ..................... 310/90 |
| 6,069,429 A * | 5/2000 | Yamamoto et al. ........... 310/90 |
| 6,130,802 A | 10/2000 | Rahman et al. |
| 6,137,650 A | 10/2000 | Heine et al. |
| 6,144,523 A | 11/2000 | Murthy et al. |
| 6,154,339 A | 11/2000 | Grantz et al. |
| 6,219,199 B1 | 4/2001 | Sakuragi et al. |
| 6,292,328 B1 | 9/2001 | Rahman et al. |
| 6,296,390 B1 * | 10/2001 | Wolff et al. .................. 384/112 |
| 6,357,916 B2 | 3/2002 | Saeki et al. |
| 6,361,214 B1 | 3/2002 | Ichiyama |

* cited by examiner

Primary Examiner—Robert S. Tupper
(74) Attorney, Agent, or Firm—Joel Lutzker; Anna Vishev; Schulte Roth & Zabel

(57) ABSTRACT

A spindle motor for use in a disk drive having a rotor assembly and a stator assembly. The rotor assembly has a hub and a rotating shaft with an outer diameter, the hub being mounted for rotation on the rotating shaft. The stator assembly has a bearing sleeve with a bottom opening, the rotating shaft being inserted into the bearing sleeve for rotation. A counter-plate is inserted into the bottom opening of the bearing sleeve thereby closing the bottom opening. A thrust plate is mounted on the rotating shaft in opposing relationship with the counter-plate, the thrust plate having an outer diameter. A fluid dynamic thrust bearing is formed between the counter-plate and the thrust plate. A ratio between the outer diameter of the shaft to the outer diameter of the thrust plate is reduced to reduce spindle motor's power consumption.

20 Claims, 3 Drawing Sheets

LOW POWER SPINDLE MOTOR WITH A FLUID DYNAMIC THRUST BEARING HAVING A REDUCED OUTER DIAMETER

RELATED APPLICATIONS

This application claims all rights of priority to U.S. Provisional Patent Application No. 60/363,818 filed on Mar. 12, 2002.

FIELD OF THE INVENTION

The following invention relates to electronic spindle motors of the type used in disk drives and in particular relates to improvements in fluid thrust bearings for such motors.

BACKGROUND OF THE INVENTION

Disc drive systems have been used in computers and other electronic devices for many years for storage of digital information. Information is recorded on concentric memory tracks of a magnetic disc medium, the actual information being stored in the form of magnetic transitions within the medium. The discs themselves are rotatably mounted on a spindle, the information being accessed by means of transducers located on a pivoting arm which moves radially over the surface of the disc. The read/write heads or transducers must be accurately aligned with the storage tracks on the disc to ensure proper reading and writing of information; thus the discs must be rotationally stable.

Electric spindle motors of the type used in disk drives conventionally rely on ball bearings to support a rotary member, such as a rotating hub, on a stationary member, such as a shaft. Ball bearings are known to wear parts, and in time increased friction will cause failure of the motor. In addition, ball bearings create debris in the form of dust or fine particles that can find their way into "clean" chambers housing the rotary magnetic disks which are driven by the motor. The mechanical friction inherent in ball bearings also generates heat, noise and vibration, all of which are undesirable in a disk drive motor.

Fluid bearings represent a considerable improvement over conventional ball bearings in spindle drive motors. In these types of systems, lubricating fluid, either gas or liquid, functions as the actual bearing surface between a stationary base or housing in the rotating spindle or rotating hub of the motor. For example, liquid lubricants comprising oil, more complex ferro-magnetic fluids or even air have been utilized in hydrodynamic bearing systems.

An example of a conventional spindle motor utilizing fluid dynamic bearings is shown in FIG. 3. As shown therein, a journal bearing is built upon a shaft rotating inside a bushing. A thrust plate is provided with pressure-generating groove sections (not shown). The rotation of the shaft churns and pumps the fluid as a function of the direction, width, and angle of the grooves with respect to the sense of rotation. This pumping action builds up multiple pressure zones along the journal and the thrust plates, maintaining a fluid film between the rotating parts, and providing the stiffness of the bearing. A spindle motor designed in accordance with FIG. 3, however, results in a high power consumption.

SUMMARY OF THE INVENTION

It is an object of the present invention to provide a spindle motor with a fluid dynamic thrust bearing which saves run-current and, therefore, reduces power consumption of the spindle motor.

In accordance with the preferred embodiment, a spindle motor for use in a disk drive is provided, the spindle motor having a rotor assembly and a stator assembly. The rotor assembly has a hub and a rotating shaft with an outer diameter, the hub being mounted for rotation on the rotating shaft. The stator assembly has a bearing sleeve with a bottom opening, the rotating shaft being inserted into the bearing sleeve for rotation. A counter-plate is inserted into the bottom opening of the bearing sleeve thereby closing the bottom opening. A thrust plate is mounted on the rotating shaft in opposing relationship with the counter-plate, the thrust plate having an outer diameter. A fluid dynamic thrust bearing is formed between the counter-plate and the thrust plate. A ratio between the outer diameter of the shaft to the outer diameter of the thrust plate is reduced to reduce spindle motor's power consumption.

The above and other objects, aspects, features and advantages of the invention will be more readily apparent from the description of the preferred embodiments thereof taken in conjunction with the accompanying drawings.

BRIEF DESCRIPTION OF THE DRAWINGS

The invention is illustrated by way of example and not limitation and the figures of the accompanying drawings in which like references denote like or corresponding parts, and in which.

DETAILED DESCRIPTION OF THE PREFERRED EMBODIMENTS AND THE DRAWINGS

Figure 1:
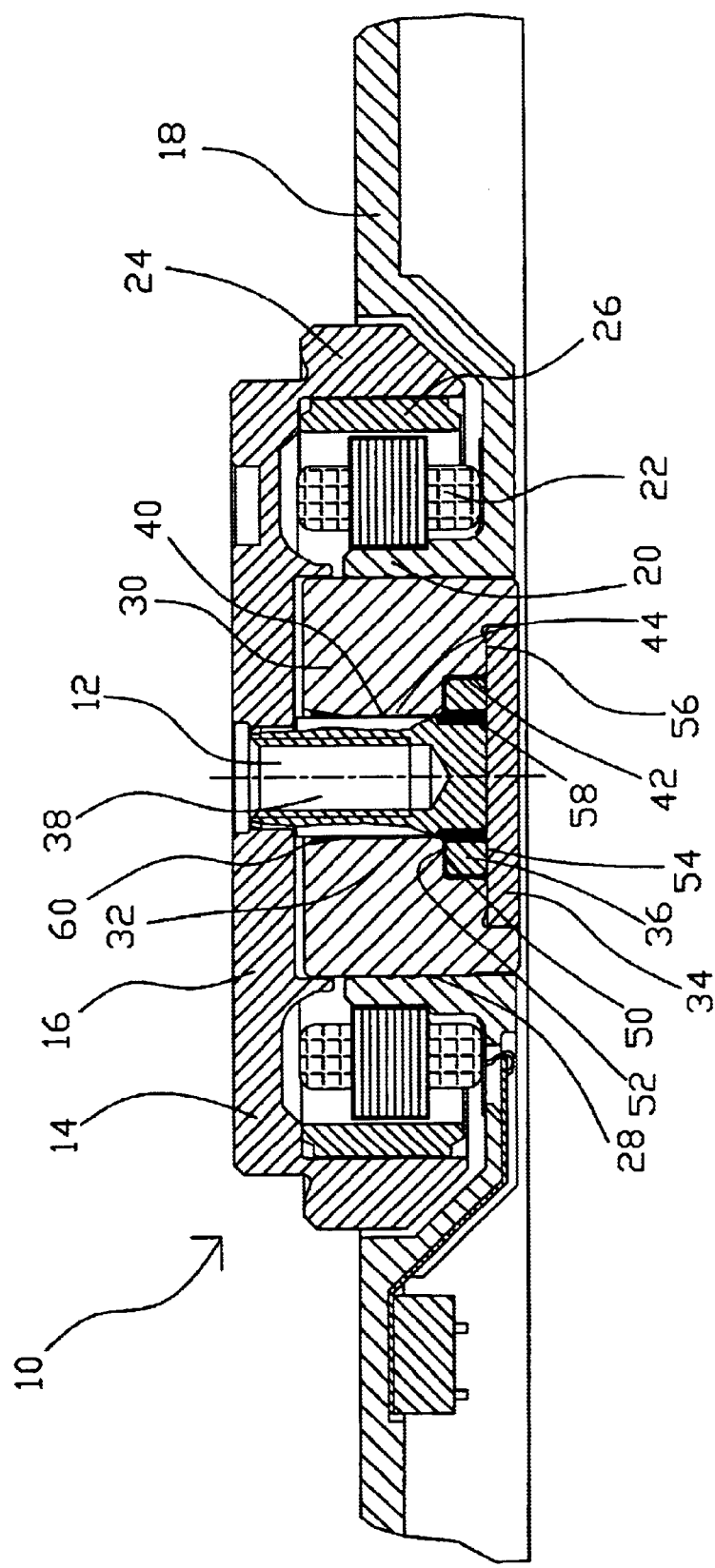
FIG. 1 is a side cut-away view of an electronic spindle motor having a shaft with an integrated thrust-washer and a first thrust bearings provided between the thrust-washer and the bearing sleeve and a second thrust bearing provided between the thrust-washer and a counter-plate.

As shown in FIG. 1, a compact electronic spindle motor 10 preferably includes a central shaft 12 supporting for rotation a rotor 14 having a hub 16. When the motor 10 is used in a disc drive, the hub 16 will support and carry a magnetic disc (not shown) during rotation. The rotor 14 comprises an annular vertical rotor support wall 24, which supports rotor magnets 26. A stator 18 preferably includes an annular vertical stator support wall 20, which supports a plurality of stator windings 22 such that the stator windings are located in opposing relationship with rotor magnets 26.

The stator support wall 20 defines an inner cylindrical hole 28. A bearing sleeve 30 is inserted into the inner cylindrical hole 28 and is fixedly mounted therein. The bearing sleeve 30 may be glued to the inner wall of the hole 28. In the preferred embodiment, the bearing sleeve 30 has an inner bore 32 with substantially cylindrical walls and an opening on each side of the bore. A bottom opening of the bore is preferably closed with a counter-plate 34. The central shaft 12 is preferably inserted into the bore 32 through its top opening such that a gap 40 is formed between an outer surface of the shaft 12 and an inner surface of the bore 32.

The central shaft 12 preferably includes a vertical cylinder portion 38 and a thrust-washer portion 36 formed integrally with the vertical cylinder portion 38 and extending outwardly therefrom. The bore 32 of the bearing sleeve preferably includes a vertical portion 44 and an outwardly extended portion 42, which has an inner diameter greater than the inner diameter of the vertical portion 44. When the shaft 12 is inserted into the bore 32, the vertical cylinder portion 38 of the shaft 12 is preferably located substantially within the vertical portion 44 of the bore 32. Similarly, the thrust-washer portion 36 of the shaft 12 is preferably located substantially within the outwardly extended portion 42 of the bore 32.

Figure 2:
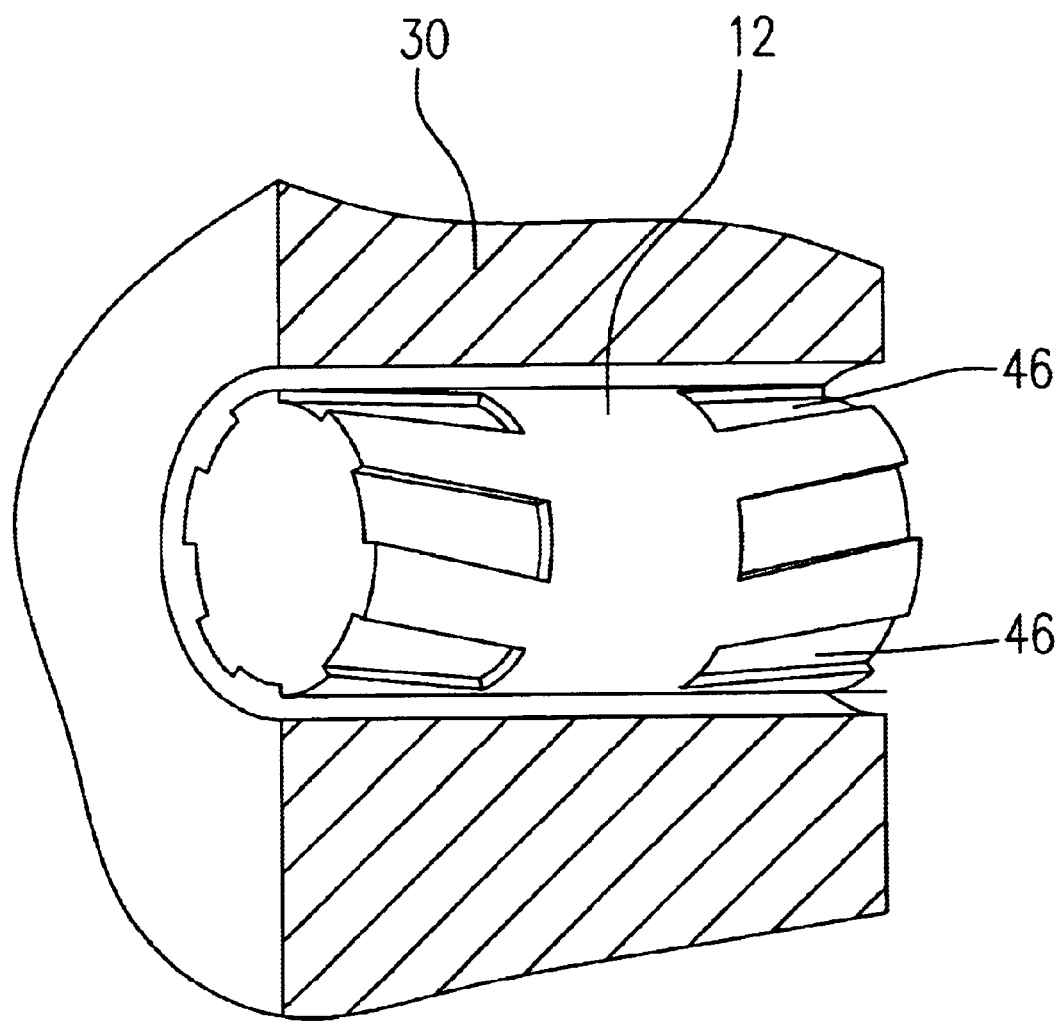
FIG. 2 is a perspective view of the shaft inserted into a bearing sleeve and having a plurality of herringbone grooves.
Figure 3:
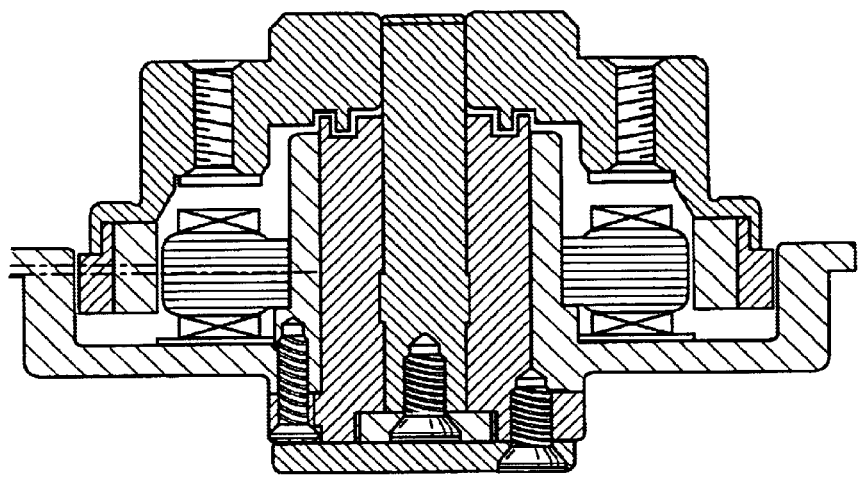
FIG. 3 is a side cut-away view of an electronic spindle motor known in the art.

At least one radial dynamic bearing is provided between the outer surface of the vertical cylinder portion 38 of the shaft 12 and the inner surface of the vertical portion 44 of the bore 32. During the rotation, dynamic pressure is generated by herringbone grooves 46 provided on either the shaft 12, as shown in FIG. 2, or the bore 32.

There are two thrust bearings provided in the preferred embodiment of the spindle motor in accordance with the present invention. One thrust bearing is preferably provided between an upper surface 50 of the thrust-washer portion 36 and a surface 52 of the outwardly extended portion 42 situated in opposing relationship with the upper surface 50. Either the upper surface 50 or the upper surface 52 may be provided with dynamic pressure generating herringbone or spiral grooves. Another thrust bearing is preferably formed between a lower surface 54 of the thrust-washer portion of the shaft 12 and an upper surface 56 of the counter-plate 34. Either the lower surface 54 or the upper surface 56 may be provided with dynamic pressure generating herringbone or spiral grooves.

The power consumption of a spindle motor having a fluid dynamic thrust bearing depends on an outer diameter of the thrust-washer. In a conventional spindle motor, having a fluid dynamic bearing structure similar to the one described above and having a conventional thrust-washer, when thrust bearing grooves are provided on both sides of the thrust-washer, the power consumption of the motor increases four times. To reduce the power consumption of the presently disclosed and claimed motor, an outer diameter of the thrust-washer portion 36 is substantially reduced as compared to currently available designs.

The size of the outer diameter of the thrust-washer depends on the size factor of the motor (and disks), the number of disks and the spin speed of the motor. Thus, where the size of the disk drive is smaller, the number of the disks used is fewer and the spin speed is higher, the outer diameter of the thrust-washer is smaller. To determine the range of sizes of the outer diameter of the thrust-washer that would result in a lower power consumption of the presently disclosed and claimed spindle motor, empirical studies were performed. Preferred results of these studies are summarized in Table I below.

TABLE I

| Size of Disc-drive [inch] | No. of Disks | Spin Speed [rpm] | $OD_1$ of Thrust-washer [mm] | $OD_2$ of Shaft [mm] | Ratio ($OD_1/OD_2$) |
|---|---|---|---|---|---|
| 2.5 | 1 | 5400 | 5 | 3.002 | 1.666 |
| 2.5 | 2 | 7400 | 5 | 3.02 | 1.656 |
| 3.5 | 1 | 5400 | 7.1 | 3.989 | 1.780 |
| 3.5 | 1 | 7200 | 7.1 | 3.989 | 1.780 |
| 3.5 | 3 | 10000 | 7 | 3.989 | 1.755 |

Generally, it was found for 3.5" disk drives, best power consumption results were achieved where the ratio $OD_1/OD_2$ was less than 1.86. For 2.5" and smaller disk drives, best power consumption results were achieved where the same ration was less than 1.71.

The gap 40 is filled with a lubricating fluid. The thrust-washer 36 is further provided with a plurality of fluid flow channels 58 allowing for fluid circulation during the rotation of the shaft 12. The bore 32 preferably has an outwardly tapered upper portion 60 which provides a reservoir for the lubricating fluid. Tapered portion 60 also serves as a capillary seal preventing the lubricating liquid from splashing out of the gap 40 during rotation of the shaft 12.

In an alternative embodiment (not shown), the shaft 12 may be fixed to the stator 18 or the top cover of the disc drive, and the bearing sleeve 30 may be glued to the hub 16. In this alternative embodiment, the bearing sleeve 30 will rotate with the rotor of the motor around the fixed shaft 12.

For the convenience of the reader, the above description has focused on a representative sample of all possible embodiments, a sample that teaches the principles of the invention and conveys the best mode contemplated for carrying it out. The description has not attempted to exhaustively enumerate all possible variations. Other undescribed variations or modifications may be possible. For example, where multiple alternative embodiments are described, in many cases it will be possible to combine elements of different embodiments, or to combine elements of the embodiments described here with other modifications or variations that are not expressly described. Many of those undescribed variations, modifications and variations are within the literal scope of the following claims, and others are equivalent.

The claimed invention is:

1. A spindle motor for use in a disk drive comprising:
    a rotor assembly, said rotor assembly further comprising a hub and a rotating shaft having an outer diameter, said hub being mounted for rotation on said rotating shaft;
    a stator assembly, said stator assembly further comprising a bearing sleeve having a bottom opening, said rotating shaft being inserted into said bearing sleeve for rotation;
    a counter-plate inserted into said bottom opening of said bearing sleeve thereby closing said bottom opening; and
    a thrust plate mounted on said rotating shaft in opposing relationship with said counter-plate, said thrust plate having an outer diameter;
    wherein a fluid dynamic thrust bearing is formed between said counter-plate and said thrust plate, and wherein a ratio between said outer diameter of said shaft to said outer diameter of said thrust washer is less than 1.86.

2. The spindle motor according to claim 1, wherein said spindle motor is used in a disk drive having a size factor of 3.5".

3. The spindle motor according to claim 2, wherein said outer diameter of said thrust plate is approximately 7 mm.

4. The spindle motor according to claim 2, wherein said ratio is approximately 1.755.

5. The spindle motor according to claim 2, wherein said ratio is approximately 1.780.

6. The spindle motor according to claim 1, wherein said spindle motor is used in a disk drive having a size factor of 2.5" or less.

7. The spindle motor according to claim 6, wherein said outer diameter of said thrust plate is approximately 5 mm.

8. The spindle motor according to claim 6, wherein said ratio is approximately 1.666.

9. The spindle motor according to claim 6, wherein said ratio is approximately 1.656.

10. The spindle motor in accordance with claim 1 further comprising a fluid dynamic radial bearing formed between said rotating shaft and said bearing sleeve.

11. A hard disk drive having a spindle motor, said spindle motor comprising:

- a rotor assembly, said rotor assembly further comprising a hub and a rotating shaft having an outer diameter, said hub being mounted for rotation on said rotating shaft;
- a stator assembly, said stator assembly further comprising a bearing sleeve having a bottom opening, said rotating shaft being inserted into said bearing sleeve for rotation;
- a counter-plate inserted into said bottom opening of said bearing sleeve thereby closing said bottom opening; and
- a thrust plate mounted on said rotating shaft in opposing relationship with said counter-plate, said thrust plate having an outer diameter;
- wherein a fluid dynamic thrust bearing is formed between said counter-plate and said thrust plate, and wherein a ratio between said outer diameter of said shaft to said outer diameter of said thrust plate is less than 1.86.

12. The disk drive according to claim 11, wherein said disk drive has a size factor of 3.5".

13. The disk drive according to claim 12, wherein said outer diameter of said thrust plate is approximately 7 mm.

14. The disk drive according to claim 12, wherein said ratio is approximately 1.755.

15. The disk drive according to claim 12, wherein said ratio is approximately 1.780.

16. The disk drive according to claim 11, wherein said disk drive has a size factor of 2.5" or less.

17. The disk drive according to claim 16, wherein said outer diameter of said thrust plate is approximately 5 mm.

18. The disk drive according to claim 16, wherein said ratio is approximately 1.666.

19. The disk drive according to claim 16, wherein said ratio is approximately 1.656.

20. The disk drive in accordance with claim 11 further comprising a fluid dynamic radial bearing formed between said rotating shaft and said bearing sleeve.

* * * * *

UNITED STATES PATENT AND TRADEMARK OFFICE
CERTIFICATE OF CORRECTION

PATENT NO. : 6,980,393 B2
DATED : December 27, 2005
INVENTOR(S) : Kull

It is certified that error appears in the above-identified patent and that said Letters Patent is hereby corrected as shown below:

<u>Column 4,</u>
Line 48, change "shaft to said outer diameter of said thrust washer is" to -- thrust washer to said outer diameter of said shaft is --.

<u>Column 5,</u>
Lines 22-23, change "ratio between said outer diameter of said shaft to said outer diameter of said thrust plate is less than 1.86" to -- ratio between said outer diameter of said thrust plate to said outer diameter of said shaft is less than 1.86 --.

Signed and Sealed this

Sixteenth Day of May, 2006

JON W. DUDAS
*Director of the United States Patent and Trademark Office*